US011182472B2

(12) United States Patent
Ogale et al.

(10) Patent No.: US 11,182,472 B2
(45) Date of Patent: Nov. 23, 2021

(54) SECURITY IN A COMPUTING ENVIRONMENT BY MONITORING EXPECTED OPERATION OF PROCESSES WITHIN THE COMPUTING ENVIRONMENT

(71) Applicant: VMware, Inc., Palo Alto, CA (US)

(72) Inventors: Nakul Ogale, Pune (IN); Shirish Vijayvargiya, Pune (IN); Sachin Shinde, Pune (IN)

(73) Assignee: VMware, Inc., Palo Alto, CA (US)

( * ) Notice: Subject to any disclaimer, the term of this patent is extended or adjusted under 35 U.S.C. 154(b) by 263 days.

(21) Appl. No.: 16/588,614

(22) Filed: Sep. 30, 2019

(65) Prior Publication Data

US 2021/0097167 A1    Apr. 1, 2021

(51) Int. Cl.
| G08B 23/00 | (2006.01) |
| G06F 12/16 | (2006.01) |
| G06F 12/14 | (2006.01) |
| G06F 11/00 | (2006.01) |
| G06F 21/52 | (2013.01) |
| G06N 20/00 | (2019.01) |

(52) U.S. Cl.
CPC ........ *G06F 21/52* (2013.01); *G06F 2221/033* (2013.01); *G06N 20/00* (2019.01)

(58) Field of Classification Search
CPC ...................................................... G06F 21/52
USPC .......................................................... 726/22
See application file for complete search history.

(56) References Cited

U.S. PATENT DOCUMENTS

| 7,565,686 B1* | 7/2009 | Sobel ...................... G06F 21/51 713/164 |
| 7,647,636 B2* | 1/2010 | Polyakov ............... G06F 21/566 726/24 |
| 7,814,544 B1* | 10/2010 | Wilhelm ............... G06F 21/566 726/22 |
| 7,971,255 B1* | 6/2011 | Kc ......................... G06F 21/566 726/24 |
| 8,214,900 B1* | 7/2012 | Satish ................... G06F 21/554 726/23 |
| 8,312,249 B1* | 11/2012 | Trumbull ............... G06F 9/4484 711/203 |
| 8,950,007 B1* | 2/2015 | Teal ........................ G06F 21/57 726/30 |
| 2003/0217140 A1* | 11/2003 | Burbeck .......... H04L 29/12009 709/224 |
| 2006/0095969 A1* | 5/2006 | Portolani ............ H04L 67/1002 726/23 |

(Continued)

OTHER PUBLICATIONS

Deepa Srinivasan; Process Out-Grafting: An Efficient "Out-of-VM" Approach for Fine-Grained Process Execution Monitoring; ACM; 2011; pp. 363-374.*

*Primary Examiner* — Monjur Rahim

(57) ABSTRACT

A process monitoring methodology is disclosed. In a computer-implemented method, a selection of a process to be monitored is received. The process is to be at least partially performed using a component of a computing environment. An expected operating parameter of the process is determined. The process is also monitored to determine an actual operating parameter of the process. The actual operating parameter of the process is compared with the expected operating parameter of the process to generate a comparison result. An operation is then automatically performed based upon the comparison result.

17 Claims, 4 Drawing Sheets

(56) References Cited

U.S. PATENT DOCUMENTS

| | | | |
|---|---|---|---|
| 2007/0101317 A1* | 5/2007 | Shoji | G06F 21/52 717/131 |
| 2008/0195868 A1* | 8/2008 | Asokan | G06F 21/64 713/176 |
| 2009/0007223 A1* | 1/2009 | Centonze | G06F 21/6227 726/1 |
| 2009/0177956 A1* | 7/2009 | Huang | G06F 40/174 715/221 |
| 2009/0282477 A1* | 11/2009 | Chen | G06F 21/51 726/22 |
| 2010/0031360 A1* | 2/2010 | Seshadri | G06F 21/57 726/24 |
| 2010/0274910 A1* | 10/2010 | Ghanaie-Sichanie | H04L 67/42 709/229 |
| 2011/0067010 A1* | 3/2011 | Dullien | G06F 21/564 717/132 |
| 2011/0185417 A1* | 7/2011 | Zhou | G06F 21/566 726/22 |
| 2011/0289586 A1* | 11/2011 | Kc | G06F 21/566 726/24 |
| 2012/0117644 A1* | 5/2012 | Soeder | G06F 21/554 726/22 |
| 2012/0291131 A1* | 11/2012 | Turkulainen | G06F 21/554 726/24 |
| 2014/0075555 A1* | 3/2014 | Shilimkar | G06F 21/56 726/23 |
| 2014/0115652 A1* | 4/2014 | Kapoor | G06F 21/554 726/1 |
| 2014/0215602 A1* | 7/2014 | Chuaprasort | H04L 63/0876 726/20 |
| 2014/0245446 A1* | 8/2014 | Shanmugavelayutham | G06F 21/54 726/24 |
| 2014/0310809 A1* | 10/2014 | Li | G06F 21/84 726/23 |
| 2014/0325650 A1* | 10/2014 | Pavlyushchik | G06F 21/566 726/23 |
| 2015/0199532 A1* | 7/2015 | Ismael | G06F 21/552 726/30 |
| 2016/0234307 A1* | 8/2016 | Yan | H04L 67/42 |
| 2017/0032118 A1* | 2/2017 | Carson | G06F 21/52 |

* cited by examiner

SECURITY IN A COMPUTING ENVIRONMENT BY MONITORING EXPECTED OPERATION OF PROCESSES WITHIN THE COMPUTING ENVIRONMENT

BACKGROUND ART

In various computing environments, including, for example machine learning environments, utility data centers, and various other environments, it is necessary to provide security for the various components in the computing environment against numerous cyber threats. One such security measure is provided by the AppDefense™ platform of VMware, Inc developed by VMware, Inc. of Palo Alto, Calif. Typically, a system administrator (e.g., an Information Technology (IT) administrator, or the like) registers those machines or components of the computing environment, for which the IT administrator desires protection against cyber threats, with a security system such as the above-mentioned AppDefense™ platform of VMware, Inc. Conventionally, the IT administrator registers the machines or components by manually defining or listing the components, including virtualized machines or components, within the computing environment that are to be registered with the security system being used.

In conventional approaches to protecting services and applications in a computing environment, various processes are evaluated and ultimately deemed as trusted processes. These trusted processes are then allowed to run and, for example, make connections within the computing environment. Such trusted processes are deemed as "whitelisted" processes for the computing environment. Typically, once processes are designated as whitelisted, the whitelisted processes are not monitored.

As a result, such whitelisted processes, due to their scope of access and ability to operate within the computing environment, may unintentionally and deleteriously provide nefarious entities with an opportunity to access the computing environment. For example, such whitelisted processes can be attacked via code injection or process hollowing thereby allowing unwanted attackers to perform malicious activities and thereby compromise the computing system. Moreover, it has been observed that some nefarious entities may even embed a virus in a whitelisted process to ultimately control the whitelisted process and, for example, control the whitelisted process using attack methodologies via process hollowing, dynamic-link library (DLL) injection, inducing stack overflow, and the like. As a result, in some conventional computing systems, even when a security measure being utilized, whitelisted processes (or other processes or programs accessible via the whitelisted process) may have their behavior influenced to perform in a manner that the creators or users of the whitelisted process authors did not anticipate or intend.

Thus, conventional approaches for providing security to processes of a computing environment, including a machine learning environment, have an existing vulnerability.

BRIEF DESCRIPTION OF THE DRAWINGS

The accompanying drawings, which are incorporated in and form a part of this specification, illustrate embodiments of the present technology and, together with the description, serve to explain the principles of the present technology.

Figure 1:
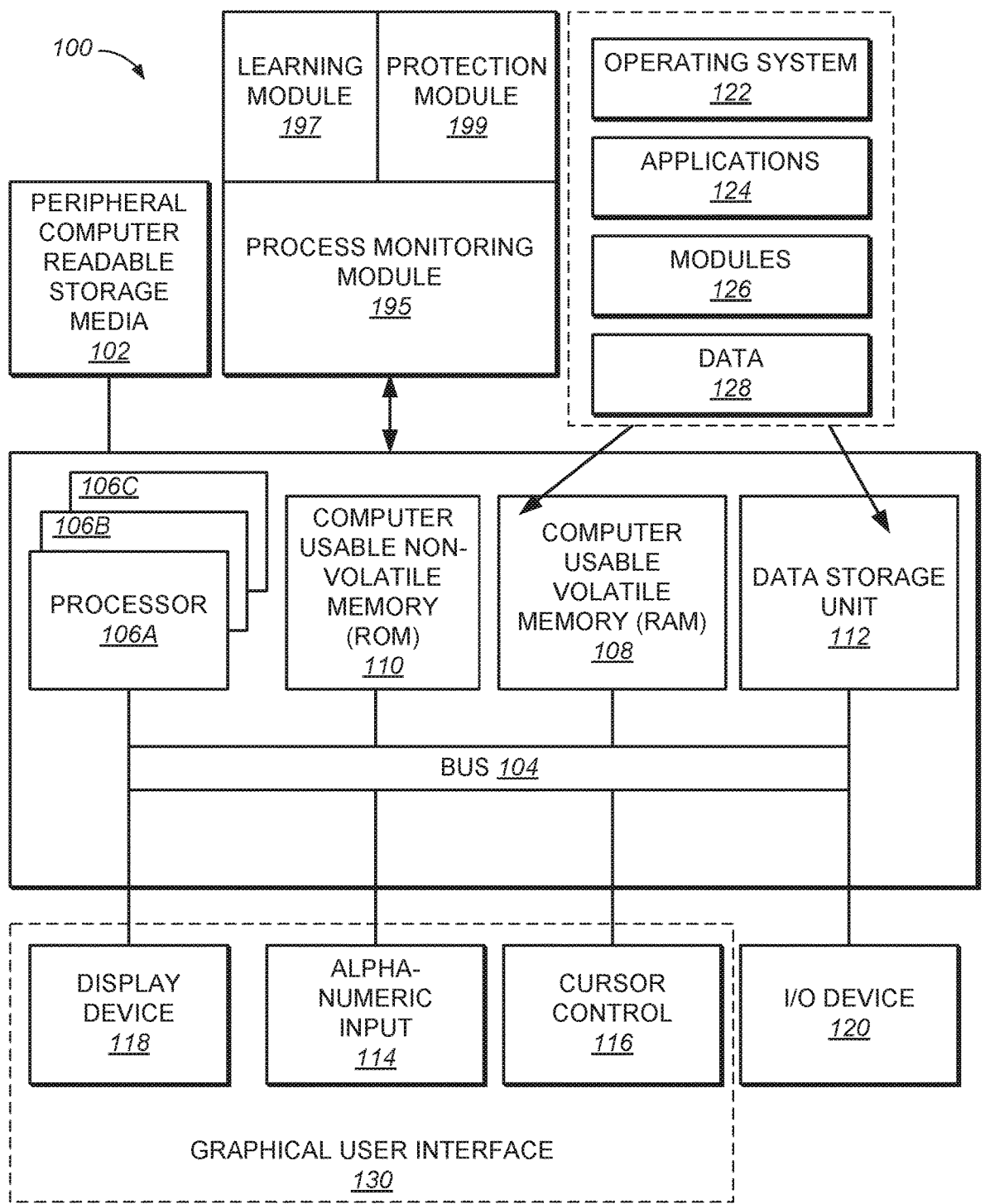
FIG. 1 shows an example computer system upon which embodiments of the present invention can be implemented, in accordance with an embodiment of the present invention.

The drawings referred to in this description should not be understood as being drawn to scale except if specifically noted.

DETAILED DESCRIPTION OF EMBODIMENTS

Reference will now be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present technology.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some embodiments, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 1066, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 1066, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 1066, and 106C). GUI 130 allows user to interact with system 100 through graphical representations presented on display device 118 by interacting with alpha-numeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Brief Overview

First, a brief overview of an embodiment of the present Improved Security In A Computing Environment By Monitoring Expected Operation Of Processes invention, is provided below. Various embodiments of the present invention provide a method and system for automated monitoring of a process operating at least partially within a computing environment.

Moreover, embodiments of the present Improved Security In A Computing Environment By Monitoring Expected Operation Of Processes invention operates in two modes, a learning mode and a protection mode. In one embodiment, when in learning mode, a Guest Agent (a guest component of the AppDefense™ platform 404 of VMware, Inc. of Palo Alto) monitors the behavior of a process and provides information regarding the behavior of the monitored process to a Cloud Manager (another component of component of the AppDefense™ platform 404). In some embodiments, the Cloud Manager is disposed outside of the Guest Agent. In various embodiments, the Cloud Manager then generates a policy corresponding to the operation of the process based upon the observed behavior of the process. In some embodiments, the Cloud Manager then sends the policy to the Guest Agent for enforcement in the "protection mode". In the protection mode, in various embodiments of the present invention, the learned behavior of the process, via the corresponding generated policy, is enforced. A more detailed description of the present Improved Security In A Computing Environment By Monitoring Expected Operation Of Processes invention is provided below.

More specifically, the various embodiments of the present invention provide a novel approach for monitoring a process operating at least partially within a computing environment such as, for example, machine learning environment. In one embodiment, the present Improved Security In A Computing Environment By Monitoring Expected Operation Of Processes invention first operates in a "learning mode" in order to determine a baseline for expected operating parameters of process. Next, in various embodiments of the present invention, the present Improved Security In A Computing Environment By Monitoring Expected Operation Of Processes invention then operates in a "protection mode" in order to compare actual operating parameters of the monitored process with the expected operating parameters of the process. In embodiments of the present Improved Security In A Computing Environment By Monitoring Expected Operation Of Processes invention, If any process's operating parameters deviate from a defined policy, a notification alarm is generated. In so doing, embodiments of the present invention improve security by automatically monitoring and detecting improper behavior of a process, even including whitelisted processes. Thus, the present Improved Security In A Computing Environment By Monitoring Expected Operation Of Processes invention beneficially eliminates an existing point of vulnerability (nefarious attacks utilizing whitelisted processes) by monitoring and recognizing improper operation of processes including whitelisted processes.

As will also be described below, in various embodiments, the present invention is a computing module (shown as process monitoring module 195 which is discussed in detail below) which is integrated within a security system such as, for example, the AppDefense™ platform 404 of VMware, Inc. of Palo Alto. In various embodiments, the present Improved Security In A Computing Environment By Monitoring Expected Operation Of Processes invention, will itself generate an alert when detecting improper operation of a process after observing the activity by various processes, for example whitelisted processes, operating via the machines or components of a computing system for a period of time.

Importantly, for purposes and brevity and clarity, the following detailed description of the various embodiments of the present invention, will be described using an example in which the embodiments of the present Improved Security In A Computing Environment By Monitoring Expected Operation Of Processes invention are integrated into security system, such as, but not limited to, AppDefense™ platform 404 from VMware, Inc. of Palo Alto, Calif. Importantly, although the description and examples herein refer to embodiments of the present invention applied to the above security system with, for example, its corresponding set of functions, it should be understood that the embodiments of the present invention are well suited to use with various other types of computer systems. Furthermore, although, for purposes of brevity and clarity, the present description and examples herein refer to AppDefense™ platform 404, it should be understood that the AppDefense™ platform 404 from VMware, Inc. of Palo Alto, Calif., may also be defined to include various other components. Furthermore, in various embodiments of the present invention, process monitoring module 195 is integrated into to AppDefense™ platform 404. In various other embodiments of the present invention, process monitoring module 195 is not disposed within, or integrated with, AppDefense™ platform 404.

Additionally, for purposes of brevity and clarity, the present application will refer to processes operating via "machines or components" of a computing environment. It should be noted that for purposes of the present application, the terms "machines or components" are intended to encompass physical (e.g., hardware and software based) computing machines, physical components (such as, for example, physical modules or portions of physical computing machines) which comprise such physical computing machines, aggregations or combination of various physical computing machines, aggregations or combinations or various physical components and the like. Further, it should be noted that for purposes of the present application, the terms "machines or components" are also intended to encompass virtualized (e.g., virtual and software based) computing machines, virtual components (such as, for example, virtual modules or portions of virtual computing machines) which comprise such virtual computing machines, aggregations or combination of various virtual computing machines, aggregations or combinations or various virtual components and the like.

Additionally, for purposes of brevity and clarity, the present application will refer to processes operating via machines or components of a computing environment. It should be noted that for purposes of the present application, the term "computing environment" is intended to encompass any computing environment (e.g., a plurality of coupled computing machines or components including, but not limited to, a networked plurality of computing devices, a neural network, a machine learning environment, and the like). Further, in the present application, the computing environment may be comprised of only physical computing machines, only virtualized computing machines, or, more likely, some combination of physical and virtualized computing machines.

Furthermore, again for purposes and brevity and clarity, the following description of the various embodiments of the present invention, will be described as integrated within a security system. Importantly, although the description and examples herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding processes operating via various machines or components of a computing environment can then be provided as desired to a separate system or to an end user such as, for example, an IT administrator.

Importantly, the embodiments of the present Improved Security In A Computing Environment By Monitoring Expected Operation Of Processes invention significantly extend what was previously possible with respect to providing security for processes operating via machines or components of a computing environment. Various embodiments of the present Improved Security In A Computing Environment By Monitoring Expected Operation Of Processes invention enable the improved capabilities while reducing reliance upon, for example, an IT administrator, to selectively monitor processes operating via various machines or components of a computing environment for security protection and monitoring. This is in contrast to conventional approaches for providing security to various processes operating via machines or components of a computing environment in which whitelisted processes are not monitored at all, or which are highly dependent upon the skill and knowledge of a system administrator. Thus, embodiments of present Improved Security In A Computing Environment By Monitoring Expected Operation Of Processes invention provide a methodology which extends well beyond what was previously known.

Also, although certain components are depicted in, for example, embodiments of the Improved Security In A Computing Environment By Monitoring Expected Operation Of Processes invention, it should be understood that, for purposes of clarity and brevity, each of the components may themselves be comprised of numerous modules or macros which are not shown.

Procedures of the present Improved Security In A Computing Environment By Monitoring Expected Operation Of Processes invention are performed in conjunction with various computer software and/or hardware components. It is appreciated that in some embodiments, the procedures may be performed in a different order than described above, and that some of the described procedures may not be performed, and/or that one or more additional procedures to those described may be performed. Further some procedures, in various embodiments, are carried out by one or more processors under the control of computer-readable and computer-executable instructions that are stored on non-transitory computer-readable storage media. It is further appreciated that one or more procedures of the present invention may be implemented in hardware, or a combination of hardware with firmware and/or software.

Hence, the embodiments of the present Improved Security In A Computing Environment By Monitoring Expected Operation Of Processes invention greatly extend beyond conventional methods for providing security to processes operating via machines or components of a computing environment. Moreover, embodiments of the present invention amount to significantly more than merely using a computer to provide conventional security measures to processes operating via machines or components of a computing environment. Instead, embodiments of the present invention specifically recite a novel process, necessarily rooted in computer technology, for Improved Security In A Computing Environment By Monitoring Expected Operation Of Processes.

Furthermore, in various embodiments of the present invention, and as will be described in detail below, a security system, such as, but not limited to, the AppDefense™ platform 404 from VMware, Inc. of Palo Alto, Calif. will include a novel security solution for a computing environment (including, but not limited to a data center comprising a virtual environment). In embodiments of the present invention, unlike conventional security systems in which whitelisted processes may not be monitored at all, the present security system will instead focus on monitoring the expected states of whitelisted processes operating via machines or components of the computing environment, and the present security system will raise alarms if any anomaly behavior is detected.

Additionally, as will be described in detail below, embodiments of the present invention provide a security system including a process monitoring feature for processes operating via machines or components (including, but not limited to, virtual machines) of the computing environment. The novel monitoring feature of the present security system enables ends users to readily observe and monitor processes operating via machines or components of the computing environment.

Continued Detailed Description of Embodiments after Brief Overview

In embodiments of the present invention, a security system such as, for example, the AppDefense™ platform 404 from VMware, Inc. of Palo Alto, Calif. will utilize the present Improved Security In A Computing Environment By Monitoring Expected Operation Of Processes invention to automatically perform the process monitoring as described below. That is, as will be described in detail below, in embodiments of the present Improved Security In A Computing Environment By Monitoring Expected Operation Of Processes invention, a computing module, such as, for example, process monitoring module 195 of FIG. 1, is coupled with a computing environment. Additionally, it should be understood that in embodiments of the present Improved Security In A Computing Environment By Monitoring Expected Operation Of Processes invention process monitoring module 195 of FIG. 1 may be integrated with one or more of the various components of FIG. 1. Process monitoring module 195 then automatically evaluates the various processes operating via machines or components of the computing environment. As will be described below, in various embodiments of the present invention, process monitoring module 195 is comprised of a learning module 197 and a protection module 199. In FIG. 1, process monitoring module 195 and learning module 197 are depicted as co-located within a single module, i.e. process monitoring module 195. It should be noted, however, that in various other embodiments of the present invention, learning module 197 and protection module 199 are not co-located, but even when not co-located, learning module 197 and protection module 199 cumulatively comprise process monitoring module 195.

Figure 2:
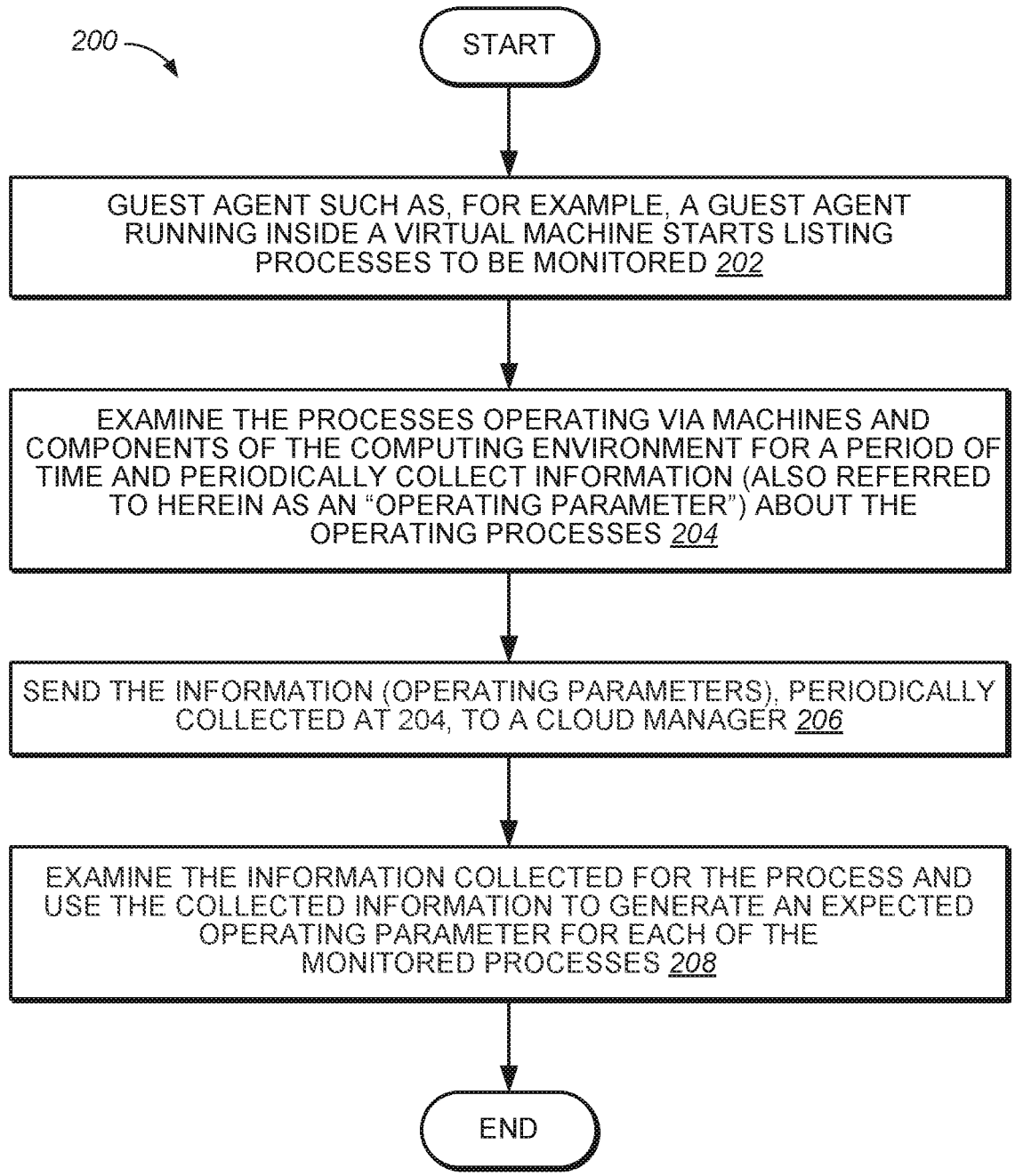
FIG. 2 is a flow chart of steps performed by the present Improved Security In A Computing Environment By Monitoring Expected Operation Of Processes method during learning mode, in accordance with an embodiment of the present invention.

With reference now to FIG. 2, in various embodiments, a guest agent is utilized to perform various actions corresponding to a "learning mode" of the present invention.

Referring again to FIG. 2, in flow chart 200, as shown at 202, a guest agent such as, for example, a guest agent running inside a virtual machine starts listing processes to be monitored. In various embodiments of the present invention, the processes to be monitored will include whitelisted processes. In other embodiments, learning module 197 receives a listing of processes (which may include whitelisted processes) to be monitored rather than self-generating the list of processes to be monitored.

With reference still to FIG. 2, as shown at 204, various embodiments of the present Improved Security In A Computing Environment By Monitoring Expected Operation Of Processes invention examine the processes operating via machines and components of the computing environment for a period of time and periodically collect information (also referred to herein as an "operating parameter") about the operating processes. In various embodiments, such collected information (operating parameters) about the operating process will include, but is not limited to, network data, central processing unit (CPU) information, input and output (I/O) statistics, disk read/write data, and the like.

Referring again to FIG. 2, at 206 embodiments of the present Improved Security In A Computing Environment By Monitoring Expected Operation Of Processes invention sends the information periodically collected (operating parameters), as described above at 204, to a cloud manager.

With reference next to 208 of FIG. 2, in various embodiments of the present Improved Security In A Computing Environment By Monitoring Expected Operation Of Processes invention, the cloud manager then examines the information collected for the process and uses the collected information to generate an expected operating parameter for each process. In one embodiment of the present invention, the expected operating parameter for each process includes an upper boundary of operation and a lower boundary of operation for the various processes. It should be noted that, in various embodiments, 202, 204, 206 and 208 of FIG. 2 are at least partially performed by learning module 197 of FIG. 1

With reference still to FIG. 2, it should be noted that in various embodiments of the present invention, there are two levels of processes which are monitored, system processes, and user processes. Additionally, in various embodiments of the present invention, policies used to define the expected operating parameters of the monitored process will be defined based upon the process level of the monitored process.

Referring still to FIG. 2, it will be seen that at the completion of 208, embodiments of the present Improved Security In A Computing Environment By Monitoring Expected Operation Of Processes invention have generated an expected operating parameter fora monitored process.

Referring still to FIG. 2, it will be seen that at the completion of 208, in "learning mode", embodiments of the present Improved Security In A Computing Environment By Monitoring Expected Operation Of Processes invention have obtained expected operating parameters for the monitored process. In some embodiments, results from the above-described Improved Security In A Computing Environment By Monitoring Expected Operation Of Processes invention process are stored, for example, in database 424 of FIG. 4. Furthermore, in various embodiments, database 424, which stores the results of the above-described Improved Security In A Computing Environment By Monitoring Expected Operation Of Processes invention, may be separate from or integrated into novel VM search module 402.

Figure 3:
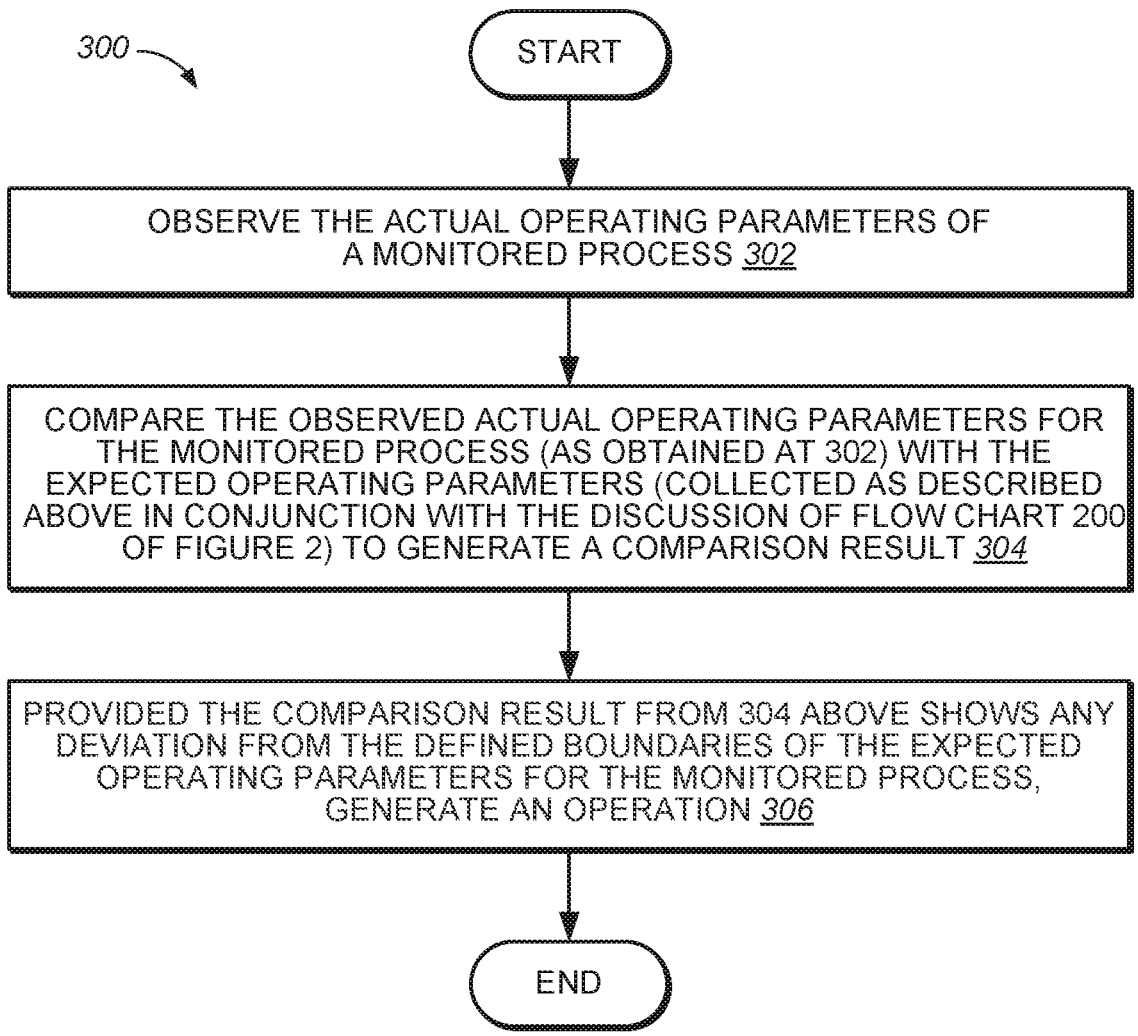
FIG. 3 is a flow chart of steps performed by the present Improved Security In A Computing Environment By Monitoring Expected Operation Of Processes method during protection mode, in accordance with an embodiment of the present invention.

Referring now to flow chart 300 of FIG. 3, embodiments of the present invention then enter into "protection mode". As shown at 300 embodiments of the present Improved Security In A Computing Environment By Monitoring Expected Operation Of Processes invention automatically monitor processes operating via the machines and components of the computing environment.

With reference now to FIG. 3, in various embodiments, a cloud manager is utilized to perform at least some of the various actions corresponding to a "protection mode" of the present invention.

Referring again to FIG. 3, in flow chart 300, as shown at 302, in "protection mode" embodiments of the present invention observe the actual operating parameters of a monitored process.

As shown in FIG. 3, at 304, embodiments of the present invention then compare the observed actual operating parameters for the monitored process (as obtained at 302 above) with the expected operating parameters (collected as described above in conjunction with the discussion of FIG. 2). In so doing, embodiments of the present invention generate a comparison result.

Referring now to 306 of FIG. 3, in embodiments of the present invention, if the comparison result from 304 above shows any deviation from the defined boundaries of the expected operating parameters for the monitored process, embodiments of the present invention then generate an operation. In one embodiment of the present invention the generated operation is comprised of generating an alarm. In another embodiment, the generated operation is to actually cease operation of the monitored process. It will be understood that embodiments of the present invention are well suited to various generated operations including, but not limited to, blocking a monitored process from further operation, modifying operation of the monitored process, generating an alarm, notifying a IT personnel of the variance of process's actual operation from an expected operation, and the like. Thus, in embodiments of the present invention, the generate operation can be based on a user-defined policy.

With reference still to FIG. 3, in various embodiments of the present invention, the upper boundary and/or the lower boundary (as described above) are periodically recalibrated, based upon different events such as a system upgrade, and the like.

Referring still to 306, in some embodiments of the present Improved Security In A Computing Environment By Monitoring Expected Operation Of Processes invention, the results from 306 of FIG. 3 are then used by a security system such as for example, the AppDefense™ platform 404 of VMware, Inc developed by VMware, Inc. of Palo Alto, Calif. to automatically monitor the processes operating via machines or components of the computing environment.

Further, in various embodiments of the present Improved Security In A Computing Environment By Monitoring Expected Operation Of Processes invention, as shown at optional 306 of FIG. 3, the embodiments will either continuously or periodically continue to automatically monitor the processes operating via machines or components of the computing environment as explicitly described above in conjunction with the discussion of FIGS. 1, 2 and 3.

Additionally, in some such embodiments, as mentioned at 306 of FIG. 3, the present Improved Security In A Computing Environment By Monitoring Expected Operation Of Processes invention, will itself then automatically allow a monitored process to continue operating or prevent a monitored process from continuing to operate based on the results of the monitoring of the process (which, in various embodiments, is operating via the various machines or components of the computing environment).

With to FIGS. 2 and 3, it should be noted that embodiments of the present Improved Security In A Computing Environment By Monitoring Expected Operation Of Processes invention, is the product of two parts a "learning mode" and a "protection mode". That is, embodiments of the present Improved Security In A Computing Environment By Monitoring Expected Operation Of Processes invention utilize the "learning mode" to first obtain expected operating parameters for a monitored process. Next, when in "protection mode" embodiments of the present Improved Security In A Computing Environment By Monitoring Expected Operation Of Processes invention compare the expected operating parameters with actual operating parameters of the monitored process and generate a comparison result.

Thus, the various embodiments of the present invention provide a novel approach for automatically monitoring processes operating via the various machines or components of a computing environment such as, for example, machine learning environment. Further, unlike conventional approaches, in embodiments of the present Improved Security In A Computing Environment By Monitoring Expected Operation Of Processes invention, even whitelisted processes are monitored in order to prevent nefarious entities from having unfettered access to the processes and machines and components of the computing environment. For example, embodiments of the present invention prevent whitelisted processes from being attacked via code injection or process hollowing. As such, embodiments of the present invention thereby prevent unwanted attackers from performing malicious activities and, thereby, prevent compromising of the processes and/or machines and components of the computing environment.

Additionally, in embodiments of the present Improved Security In A Computing Environment By Monitoring Expected Operation Of Processes invention, the IT administrator is not required to manually or continuously monitor the processes operating via machines or components of the computing environment. Instead, the present Improved Security In A Computing Environment By Monitoring Expected Operation Of Processes invention, will automatically monitor the processes operating via machines or components of the computing environment as explicitly described above in conjunction with the discussion of FIGS. 1, 2 and 3.

Once again, although various embodiments of the present Improved Security In A Computing Environment By Monitoring Expected Operation Of Processes invention described herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding processes operating via various machines or components of a computing environment can then be provided as desired to a separate system or to an end user such as, for example, an IT administrator.

As stated above, in some embodiments, the present Improved Security In A Computing process monitoring module 195 operates as a stand-alone module without requiring integration into, for example, a security system. In one such embodiment, results from the present Improved Security In A Computing Environment By Monitoring Expected Operation Of Processes invention are provided, for example, to a separate system or to an end user. In one such embodiment, end user will, for example, use the results from process monitoring module 195 to manually access the processes operating via machines and components of the computing environment.

Figure 4:
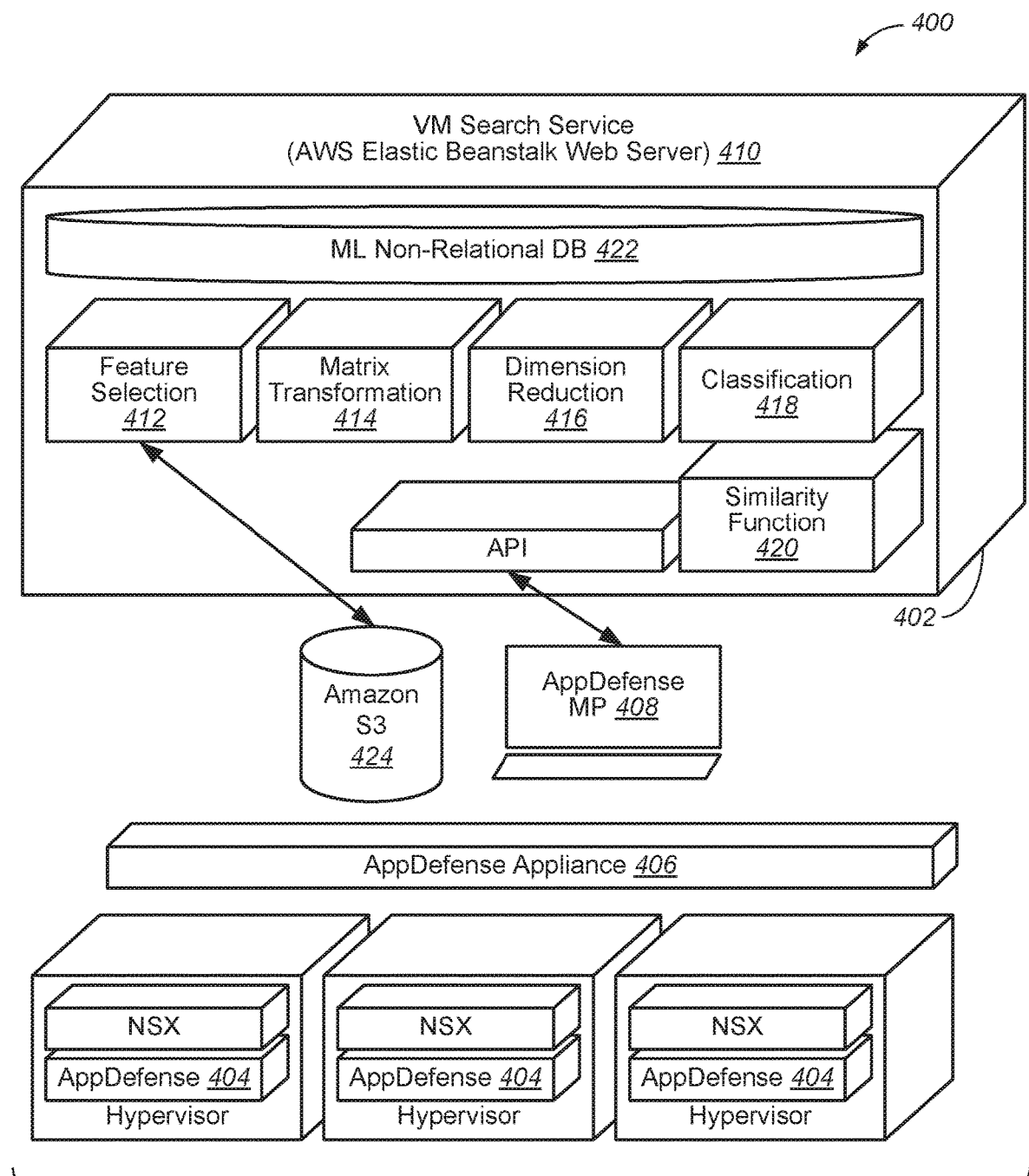
FIG. 4 is a schematic diagram of an embodiment of the present Improved Security In A Computing Environment By Monitoring Expected Operation Of Processes invention integrated with a security system, in accordance with an embodiment of the present invention.

Referring now to FIG. 4, a schematic diagram 400 of an embodiment of the present invention integrated with a security system is provided. As will be discussed below, it should be noted that in various embodiments, novel aspects of the present security system may be integrated into a complete security system. In various other embodiments, novel aspects of the present security system may exist as a separate component or module. In one such embodiment, the separate component or module will operate, for example, as a server, which runs independently from the main component of, for example, a legacy or conventional security system.

With reference still to FIG. 4, in various embodiments of the present invention, at the backend of schematic diagram 400, novel aspects of the present invention such as, for example, a process monitoring module 195 runs as a server independently from the main component of a security system such as, but not limited to, the AppDefense™ platform 404 of VMware, Inc developed by VMware, Inc. of Palo Alto, Calif. In such an embodiment, the novel aspects of the present invention run independently from the main component of a security system because the novel component uses Machine Learning (ML) techniques which heavily rely on data processing, data mining and advanced computations It should be noted that for purposes of brevity and clarity, the abbreviation VM is used herein to refer to the term "virtual machine". It should be noted, however, that the various embodiments of the present invention are not limited solely to use with virtual machines, but, instead, the various embodiments of the present invention are well suited to use with various other machines or components (including, but not limited to, virtual machines) within a computing environment.

Additionally, in various embodiments of the present invention, by having the novel aspects of the present invention run independently from the main component of a security system, embodiments of the present invention enable engineers working on the present process monitoring module 195 to have different skill sets than the skill sets of the traditional application developers who typically work on conventional security systems.

Referring still to FIG. 4, in one embodiment, the present process monitoring module 195 sits on an individual web server such as, but not limited to, for example, an AWS Elastic Beanstalk™ web server 410 of Amazon.com, Inc of Seattle, Wash. In one such embodiment as depicted in FIG. 4, novel aspects of the present invention are located in the same virtual private cloud (VPC) network as the management plane of the conventional security system (for example, but not limited to, the management plane (MP) 408 of the AppDefense™ platform 404 of VMware, Inc developed by VMware, Inc. of Palo Alto, Calif. As a result, in various embodiments of the present invention, novel aspects of the present security system, such as process monitoring module 195 are able to readily access the relational database service of the conventional security system. Furthermore, in such an embodiment of the present invention, the MP 408 can also access the application program interfaces (APIs) provided by the present process monitoring module 195.

Hence, embodiments of the present invention greatly extend beyond conventional methods for providing security to processes operating via machines or components of a computing environment. Moreover, embodiments of the present invention amount to significantly more than merely using a computer to provide conventional security measures to processes operating machines or components of a computing environment. Instead, embodiments of the present invention specifically recite a novel process, necessarily rooted in computer technology, for providing security to processes operating via machines or components of a computing environment.

Furthermore, in various embodiments of the present invention, a security system, such as, but not limited to, the AppDefense™ platform 404 from VMware, Inc. of Palo Alto, Calif. will include a novel security solution for a computing environment (including, but not limited to a data center comprising a virtual environment). In embodiments of the present invention, unlike conventional security systems which may ignore whitelisted processes altogether, the present security system focuses on monitoring the expected performance of processes (including whitelisted processes, operating via machines or components of the computing environment, and the present security system will raise alarms if any anomaly behavior is detected.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for automated monitoring of a plurality of whitelisted processes operating in a computing environment, said method comprising:

generating a listing of processes including said plurality of whitelisted processes, each said plurality of whitelisted processes to be at least partially performed using components of said computing environment;

automatically monitoring each of said plurality of whitelisted processes for a period of time to determine a baseline for a respective expected operating parameter for each of said plurality of whitelisted processes;

automatically monitoring each of said plurality of whitelisted processes during operation of each of said plurality of whitelisted processes to determine a respective actual operating parameter for each of said plurality of whitelisted processes;

comparing each of said respective actual operating parameter for each of said plurality of whitelisted processes with a corresponding each of said respective expected operating parameter for each of said plurality of whitelisted processes said process to generate respective comparison results; and automatically performing an operation based upon at least one of said respective comparison results.

2. The computer-implemented method of claim 1 wherein said determining a baseline for said respective expected performance parameter of each of said plurality of whitelisted processes further comprises:

monitoring each of said plurality of whitelisted processes for a period of time to establish a respective history of performance for each of said plurality of whitelisted processes; and utilizing said respective history of performance for each of said plurality of whitelisted processes to generate said respective expected performance parameter of each of said plurality of whitelisted processes.

3. The computer-implemented method of claim 1 wherein said determining a baseline for said respective expected performance parameter of each of said plurality of whitelisted processes further comprises:

monitoring each of said plurality of whitelisted processes for a period of time to establish a respective history of performance for each of said plurality of whitelisted processes; and generating a first boundary for each of said respective history of performance for each of said plurality of whitelisted processes.

4. The computer-implemented method of claim 1 wherein said determining a baseline for said respective expected performance parameter of each of said plurality of whitelisted processes further comprises:

monitoring each of said plurality of whitelisted processes for a period of time to establish a respective history of performance for each of said plurality of whitelisted processes;

generating an upper boundary for each of said respective history of performance for each of said plurality of whitelisted processes; and generating a lower boundary for each of said respective history of performance for each of said plurality of whitelisted processes.

5. The computer-implemented method of claim 1 wherein said automatically performing an operation based upon at least one of said respective comparison results further comprises:

generating an alarm indicating that at least one of said respective actual operating parameter differs from a corresponding said respective expected operating parameter.

6. The computer-implemented method of claim 1 wherein said automatically performing an operation based upon at least one of said respective comparison results further comprises:

ceasing operation of at least one of said plurality of whitelisted processes when said at least one of said plurality of whitelisted processes has an actual operating parameter which differs from a corresponding expected operating parameter.

7. A computer-implemented method for automated monitoring of a process in a computing environment, said method comprising:

receiving a selection of a process to be monitored, said process be at least partially performed using a component of said computing environment;

determining an expected operating parameter of said process;

monitoring said process to determine an actual operating parameter of said process;

comparing said actual operating parameter of said process with said expected operating parameter of said process to generate a comparison result; and automatically performing an operation based upon said comparison result.

8. The computer-implemented method of claim 7 wherein said receiving a selection of a process to be monitored further comprises:

receiving a selection of a whitelisted process to be monitored.

9. The computer-implemented method of claim 7 wherein said receiving a selection of a process to be monitored further comprises:

receiving a listing of a plurality of whitelisted processes and wherein at least one of said plurality of whitelisted processes is to be monitored.

10. The computer-implemented method of claim 9 wherein said receiving a selection of a process to be monitored further comprises:

receiving a listing of processes including a plurality of whitelisted processes, said plurality of whitelisted processes to be at least partially performed using components of said computing environment.

11. The computer-implemented method of claim 7 wherein said determining an expected performance parameter of said process further comprises:

monitoring said process for a period of time to establish a history of performance of said process; and utilizing said history of performance of said process to generate said expected performance parameter of said process.

12. A computer-implemented method for automated monitoring of a plurality of whitelisted processes operating in a computing environment, said method comprising:

receiving a listing of processes including said plurality of whitelisted processes, each said plurality of whitelisted processes to be at least partially performed using components of said computing environment;

determining a respective expected operating parameter for each of said plurality of whitelisted processes;

monitoring each of said plurality of whitelisted processes to determine a respective actual operating parameter for each of said plurality of whitelisted processes;

comparing each of said respective actual operating parameter for each of said plurality of whitelisted processes with a corresponding each of said respective expected operating parameter for each of said plurality of whitelisted processes said process to generate respective comparison results; and automatically performing an operation based upon at least one of said respective comparison results.

13. The computer-implemented method of claim 12 wherein said determining a baseline for said respective expected performance parameter of each of said plurality of whitelisted processes further comprises:

monitoring each of said plurality of whitelisted processes for a period of time to establish a respective history of performance for each of said plurality of whitelisted processes; and utilizing said respective history of performance for each of said plurality of whitelisted processes to generate said respective expected performance parameter of each of said plurality of whitelisted processes.

14. The computer-implemented method of claim 12 wherein said determining a baseline for said respective expected performance parameter of each of said plurality of whitelisted processes further comprises:
monitoring each of said plurality of whitelisted processes for a period of time to establish a respective history of performance for each of said plurality of whitelisted processes; and
generating a first boundary for each of said respective history of performance for each of said plurality of whitelisted processes.

15. The computer-implemented method of claim 12 wherein said determining a baseline for said respective expected performance parameter of each of said plurality of whitelisted processes further comprises:
monitoring each of said plurality of whitelisted processes for a period of time to establish a respective history of performance for each of said plurality of whitelisted processes;
generating an upper boundary for each of said respective history of performance for each of said plurality of whitelisted processes; and
generating a lower boundary for each of said respective history of performance for each of said plurality of whitelisted processes.

16. The computer-implemented method of claim 12 wherein said automatically performing an operation based upon at least one of said respective comparison results further comprises:
generating an alarm indicating that at least one of said respective actual operating parameter differs from a corresponding said respective expected operating parameter.

17. The computer-implemented method of claim 12 wherein said automatically performing an operation based upon at least one of said respective comparison results further comprises:
ceasing operation of at least one of said plurality of whitelisted processes when said at least one of said plurality of whitelisted processes has an actual operating parameter which differs from a corresponding expected operating parameter.

* * * * *